US008520686B2

(12) United States Patent
Hudson et al.

(10) Patent No.: US 8,520,686 B2
(45) Date of Patent: Aug. 27, 2013

(54) METHOD FOR INTERFACING A FIBRE CHANNEL NETWORK WITH AN ETHERNET BASED NETWORK

(75) Inventors: Charles L. Hudson, Round Rock, TX (US); Alexander Kramer, Frisco, TX (US); Neeraj Arora, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 12/989,336

(22) PCT Filed: May 8, 2008

(86) PCT No.: PCT/US2008/063094
§ 371 (c)(1),
(2), (4) Date: Oct. 22, 2010

(87) PCT Pub. No.: WO2009/136933
PCT Pub. Date: Nov. 12, 2009

(65) Prior Publication Data
US 2011/0044344 A1    Feb. 24, 2011

(51) Int. Cl.
*H04L 12/28* (2006.01)
*H04L 12/56* (2006.01)

(52) U.S. Cl.
USPC .................................................. 370/395.53

(58) Field of Classification Search
USPC ........................................... 370/254, 395.95
See application file for complete search history.

(56) References Cited

U.S. PATENT DOCUMENTS

| 6,400,730 | B1 | 6/2002 | Latif et al. | |
|---|---|---|---|---|
| 7,719,969 | B1* | 5/2010 | Dropps et al. | 370/229 |
| 7,924,840 | B1* | 4/2011 | Eiriksson et al. | 370/392 |
| 2006/0251067 | A1 | 11/2006 | DeSanti et al. | |
| 2007/0083653 | A1 | 4/2007 | Chandrasekaran et al. | |
| 2008/0028096 | A1 | 1/2008 | Henderson et al. | |
| 2008/0056300 | A1 | 3/2008 | Williams | |
| 2009/0252181 | A1* | 10/2009 | Desanti | 370/474 |
| 2009/0254677 | A1* | 10/2009 | Desanti | 709/242 |

FOREIGN PATENT DOCUMENTS

JP    2002-247072    8/2002

OTHER PUBLICATIONS

International Search Report and Written Opinion, dated Jan. 9, 2009, 12 pages.

* cited by examiner

*Primary Examiner* — Ayaz Sheikh
*Assistant Examiner* — Blanche Wong

(57) ABSTRACT

A system and method are provided for interfacing a Fiber Channel network to an Ethernet based network. The method includes the operation of establishing a connection between a Fiber Channel device and an NPIV interface in an Ethernet interconnect module (210). Another operation is processing a fabric login from a server on the Ethernet based network, along with a server identifier that is sent to the Fiber Channel device (220). Acknowledgement frames for fabric login from the Fiber Channel device can be examined in order to identify the N_Port ID of the server (230). In another operation, the server's MAC address can be retrieved from a table using the N_Port ID (240). Then an Ethernet packet can be sent to the server using the server MAC address (250). The Ethernet packet contains a Fabric Provided MAC Address used to enable the server to communicate with the Fiber Channel device.

17 Claims, 3 Drawing Sheets

METHOD FOR INTERFACING A FIBRE CHANNEL NETWORK WITH AN ETHERNET BASED NETWORK

BACKGROUND

In data centers today, the connection of a large number of data servers to both Ethernet data networks and Fibre Channel (FC) storage area networks (SANs) simultaneously can result in a complex and costly networking infrastructure due to using both types of communication fabrics. Data servers use Fibre Channel Host Bus Adapters (HBAs) and Fibre Channel (FC) switches for storage access that are completely independent of the Ethernet network interface controllers (NICs) and Ethernet switches used for other networked communication. Using separate data and storage networks results in additional cabling complexity and cost associated with the use of separate FC HBAs and Fibre Channel switches. The total cost of such hybrid networks includes the cost of Ethernet cabling, Fibre Channel cabling, Fibre Channel Host Bus Adapters (HBAs), Fibre Channel switch ports, and Ethernet switch ports. Fibre Channel connectivity can add significant cost to each server for the FC HBA, cables and the switch ports.

The current T11 Fibre Channel over Ethernet (FCoE) standardization proposes to allow Fibre Channel SAN frames to be transported over an Ethernet connection using an FCoE forwarding device (FCF). The emerging FCoE standard uses a lossless Ethernet protocol and special flow control mechanisms to avoid dropped packets. No TCP/IP protocols are used in lossless Ethernet but the layer 1 and layer 2 Ethernet protocols are applied. However, this standard and proposed FCF has some drawbacks. First, the proposed FCoE forwarding device (FCF) significantly complicates overall network management. This is because an FCF is an Ethernet switch that can also operate as a Fibre Channel switch, which increases the cost and virtually doubles the overall complexity. Second, few vendors have the combined experience in developing management software for Ethernet switches and Fibre channel switches that is important in developing an effective FCF device.

DETAILED DESCRIPTION

Figure 1:
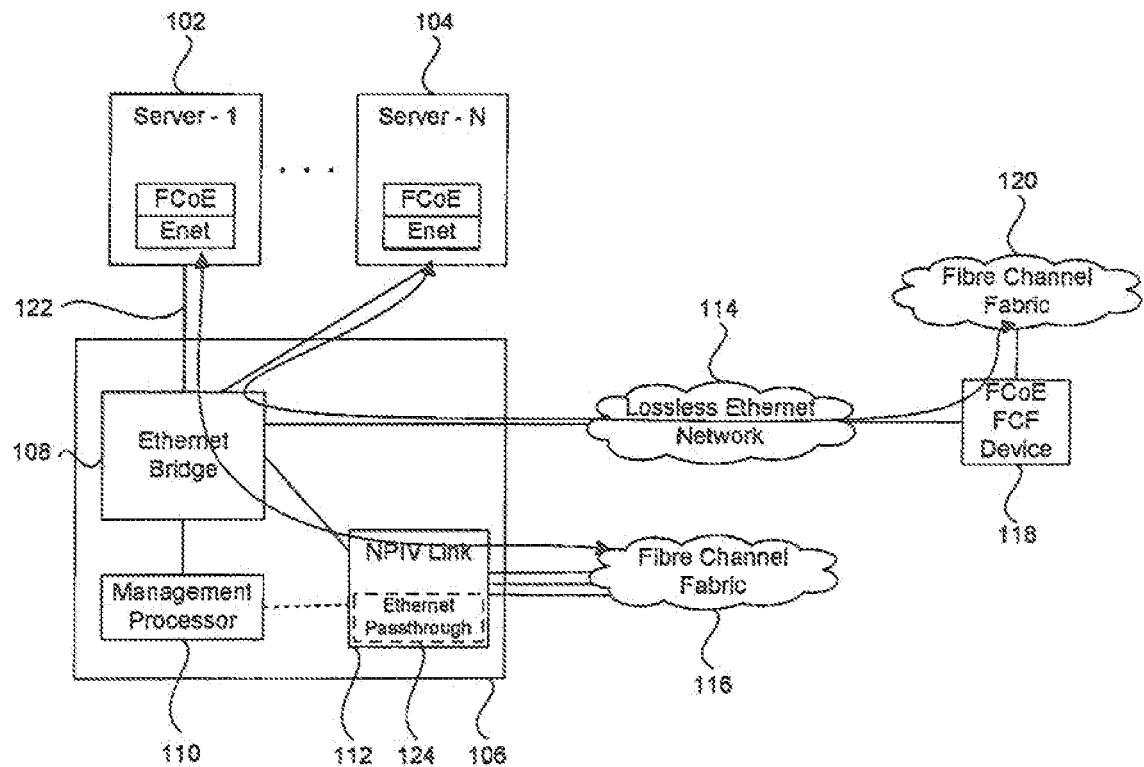
FIG. 1 is a block diagram illustrating a system for interfacing between a Fibre Channel fabric and an Ethernet network in accordance with an embodiment.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The FCoE standards body has proposed a Fibre Channel over Ethernet Forwarding (FCF) device. This approach can eliminate the need for separate FC HBA (Fibre Channel Host Bus Adapters) and FC Edge switches for data servers. However, the combination switching device results in the creation of a new class of Ethernet switch that includes the full management complexity of a Fibre Channel switch and the increased complexity is not necessarily desirable. Some of this complexity results from the consumed switch domain, the name server on the FCF, and other functions incorporated to support both networking standards.

FCF devices can interface with other FCF devices or FC SAN switches using a switch-to-switch protocol known as an expansion or E-port (or Virtual E-port). The storage industry has faced significant SAN fabric interoperability challenges when connecting switches from different vendors using E-Port interface. These incompatibilities encourage customers to use the same vendor for all FC devices where switch-to-switch connections are required. As different customers use varying FC switch vendors in their data centers, this can result in the desire to use only switches from a specific vendor to avoid the interoperability problems.

As mentioned, a drawback of an FCF device is that the device consumes an FC fabric switch domain ID. The FC fabric limits the number of FC switches on a single fabric, and this can significantly complicate a customer's overall data center fabric. Moreover, an FCF device is complex and should be managed by a system administrator with both Ethernet and Fibre Channel switch management expertise. This can significantly limit the market competition in FCF devices and result in potentially inflated pricing for such devices.

A system and method is provided to overcome the problems created by the cost and complexity of interfacing both data and storage networks together, without requiring a complex and costly FCF device. The system uses the FCoE protocol and FCoE-compatible HBA devices, but provides a vendor-independent method to connect to the Fibre Channel fabric. In addition, this system may be incorporated into Virtual Connect interconnect modules.

FIG. 1 illustrates a system for interfacing between a Fibre Channel fabric 116 and an Ethernet network 122. An Ethernet interconnect module 106 can be extended to support an FCoE-to-NPIV gateway function. This includes an Ethernet bridge 108 that connects server Ethernet links to a management processor 110 and NPIV link interface 112. One or more data servers 102, 104 are able to connect using Fibre Channel over Ethernet (FCoE).

An Ethernet interconnect module 106 is configured to receive a data stream from the data server and can form an Ethernet bridge. An Ethernet interconnect module may include a Virtual Connect Ethernet interconnect module, management firmware extensions 110 and an NPIV link interface 112. The interconnect can also include an FCoE interface device that is compliant with the proposed FCoE protocols of the T11 standards working group. A Fibre Channel device (or FC switch) is located on the FC Fabric 116 and is configured to transport and switch Fibre Channel data streams.

The NPIV interface module 112 (i.e., NPIV (N_port ID virtualization) link interface) is located in the Ethernet interconnect module 106 and is configured to receive multiple Fibre Channel data streams from the Fibre Channel device. The NPIV link can communicate using FC physical and link-layer protocols, including the management of buffer-to-buffer credits to the external FC switches. Additionally, the NPIV link can also notify the management processor about state changes.

In some embodiments, the NPIV interface may be configured by the management processor as either an Ethernet pass-through module (XAUI to serial) or an NPIV link (XAUI to NPIV FC) depending on the type of link desired. This is illustrated by the optional Ethernet pass-through module 124 illustrated in FIG. 1. In this respect, the NPIV device is configurable and can act as either an Ethernet pass through or a Fibre Channel device. XAUI is a 10 Gigabit Ethernet protocol that may be used in some embodiments but other Ethernet protocols may be used.

The NPIV interface is configured to handle encapsulation of Fibre Channel frames from the Fibre Channel device and decapsulation of Ethernet frames from the data server. Specifically, the NPIV interface is configured to encapsulate Fibre Channel frames destined for the FCoE fabric in an Ethernet packet and decapsulate FCoE packets containing frames destined for the Fibre Channel fabric. The frames are encapsulated by adding an Ethernet header, a checksum, Start of Frame (SOF), End of Frame (EOF) delimiters and padding values. The frames are decapsulated by removing this Ethernet packet information.

A management processor 110 is located in the Ethernet interconnect module and is configured to receive selected Fibre Channel frames redirected from the NPIV interface and from the data server. The management processor can examine acknowledgement frames for an FDISC operation from the Fibre Channel device in order to identify a server identity ID of server. Then the management server can retrieve a server's MAC address from within the Ethernet interconnect device using the server identity ID for lookup. For example, the server's MAC address can be retrieved from a table, hash table, or other database.

A MAC address (Media Access Control address) is a quasi-unique hardware identifier found in network interface cards and similar networkable hardware. However, it is possible to change a MAC address for most current computer hardware.

The management process can then send an Ethernet packet to the specific server using the server MAC address. Specifically, the Ethernet packet can contain a Fabric Provided MAC Address (FPMA) used to enable the server to communicate with the Fibre Channel device through the NPIV port.

The Ethernet interconnect module can also be configured to accept FCoE packets from a separate Ethernet network 114. This Ethernet network can also be connected to a FCF device 118 which connects to another Fibre Channel Fabric 120.

The Ethernet bridging function can include support for Ethernet frame pattern matching that enables Ethernet frames to be redirected to the management processor. The management processor attached to the Ethernet bridge can receive selected Ethernet packets from the network and can modify and re-inject the Ethernet packets as discussed herein. The bridge can also provide the ability to isolate selected server ports on a separate FC network.

This device and method allows multiple FCoE-capable Ethernet adapters on the servers to connect to a FC SAN fabric through an N-port interface using the NPIV capabilities defined by the T11 Fibre Channel standards. In doing so, the management processor can provide NPIV login capabilities and allow the FCoE-capable Ethernet adapters to operate as if the HBAs were directly attached to a Fibre Channel switch ports.

One problem with the adoption of the FCoE standard is that many storage area network (SAN) specialists do not have a significant amount of Ethernet experience. However, a result of the described bridging device and method is that the device maintains the separation between the Ethernet network and the SAN. This separation avoids many of the administrative ownership, security, and performance concerns that would otherwise occur. In addition, the described device provides simplified management and lower hardware interconnect costs because of the Ethernet modules used in the device.

Figure 2:
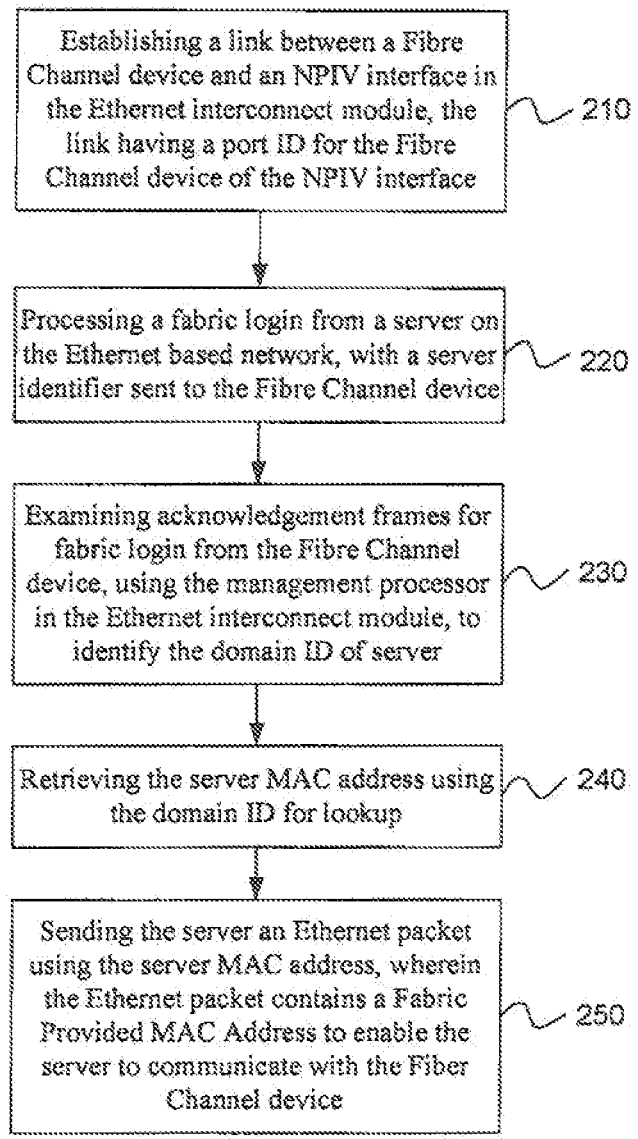
FIG. 2 is a flow chart illustrating an embodiment of a method for interfacing a Fibre Channel network to an Ethernet-based network.

FIG. 2 illustrates an embodiment of a method for interfacing a Fibre Channel network to an Ethernet based network using an Ethernet interconnect module. The method can include the operation of establishing a connection between a Fibre Channel device and an NPIV interface in the Ethernet interconnect module, as in block 210. The link and its related frame transmissions can have an N_Port ID for the Fibre Channel device for the NPIV interface. The links (or uplinks) can be configured by the management processor to advertise itself on the FC SAN as an NPIV capable device. NPIV Link module can notify the management processor once a physical link has been established.

The establishment of the link can include the initial solicitation where the server sends a multicast and the management processor responds with its MAC address as the address to be used by the server during the Fabric Login and Discovery (FLOGI/FDISC) process. Then the management processor can perform a Fabric Login (FLOGI) for the N-Port NPIV function. This FLOGI establishes a basic connection between the NPIV Link device and the external FC device (e.g., FC switch). The PC device will accept the login and assigns an N_Port ID to the originator of this first login. The management processor will reject any FLOGI attempts from the servers until this initial login is complete.

A fabric login (FLOGI can then be processed from a server on the Ethernet based network, as in block 220. This fabric login can be intercepted by the management processor looking for specific MAC DST (e.g., FC-OUI||FF:FF:FE), which converts the FLOGI to an FDISC request Converting to an FDISC is done because the NPIV will only accept FDISC requests after the initial FLOGI has completed.

The fabric login can include a server identifier that is sent to the Fibre Channel device. This login will generate an acknowledgement from the Fibre Channel device; and the Fibre Channel device can send the N_Port ID for the server (e.g., 'port 4') with the acknowledgment. In other words, the FDISC sequence provides the WWN (World Wide Name) of the server to the external FC switch and then an N_Port ID is returned in the acknowledgement. The management processor in the Ethernet interconnect module can then examine the acknowledgement frames returned from the Fibre Channel device in order to identify the N_Port ID of the server, as in block 230.

The server MAC address can be retrieved from a table (or another data storage area in the Ethernet interconnect module) using the N_Port ID for lookup, as in block 240. This is possible because the MAC address has been previously stored (e.g., in a table) during the initial login (FLOGI) from the server.

The server can then be sent an Ethernet packet using the server MAC address, as in block 250. The Ethernet packet to the server contains a Fabric Provided MAC Address (FPMA) used to enable the server to communicate with the Fibre Channel device. The reason the management processor initially looks up the server MAC address is because the MAC address used in the FDISC ACC by the NPIV device (e.g., FC_MAP|||'4') does not exist yet. The management processor then replaces the destination MAC with the server MAC address (FPMA). This look up is done only during FLOGI Acknowledgement (ACC) or FDISC Acknowledgement (ACC).

The Fabric Provided MAC address (FPMA) is a MAC address constructed from the contents received in the Fibre Channel frame from the FC device. In other words, the NPIV device can construct the server MAC address by concatenating FC_MAP with FC_DID to create the Fabric Provided MAC address. Thus, the NPIV device will add a 24-bit fixed fabric value (or the FC_MAP) to the FC_DID to generate the Fabric Provided MAC address. Every Fibre Channel fabric has a unique FC_MAP value. The FC_DID is the FC Port ID value that the fabric assigns each time the server or NPIV performs an FDISC (or FLOGI. Each new FDISC results in a new FC_DID value assignment. Combining the FC_MAP with the FC_DID provides a 48-bit MAC address that is guaranteed to be unique on the Fibre Channel fabric.

To reiterate, a new FC_DID is assigned by the FC switch during the FLOGI/FDISC ACC operations. Because the Ethernet switch does not know yet where to direct the FC_MAP||FC_DID MAC address, the management processor filters the ACC frames, does the table lookup and retrieves the MAC address that was used by the server during its FLOGI/FDISC and replaces the destination MAC with the server MAC address (FPMA).

This Fabric Provided MAC address (FPMA) is returned in the payload of the packet sent to the data server during the FDISC operation. For example, the data server can be sent the MAC address: FC_MAP||'4' (where || is the concatenation operator). In addition, if multiple FDISC operations are received from a single server link (e.g., in a VMware environment), then each FDISC operation will result in a different FPMA address that is unique.

The server will use the Fabric Provided MAC Address as its new source address for frames sent to the FC port and FC device. Operations can now proceed directly between data server and the FC Switch using the appropriate MAC address corresponding to the far end device's FC port ID (the MAC addresses of FC_MAP||'4').

Once the data server is logged into the Fibre Channel fabric then the communications destined for the FC fabric pass directly through the device to the FC uplink, and the frames coming in from the server will be routed to the correct uplink. Of course, the Fibre Channel frames will be encapsulated when they are placed onto the Ethernet network and the frames can be decapsulated from packets when they are placed onto the Fibre Channel fabric.

In Ethernet, the destination MAC address is used to route the frames correctly. In the present FCoE embodiment, the destination MAC address will be FC_MAP||'XYZ' (where || is the concatenation operation). This is not the uplink MAC address and is not enough address information to route the frame to the correct uplink. Thus, the system examines the source MAC address in the FCoE frame (e.g. it will be FC_MAP||'4'), gets the FC source port ID (4), performs a lookup into a routing table in the switch and determines which uplink port this frame will be routed to. This table will be in the switch and the management processor will be responsible for keeping the table updated. The management processor is not involved in the data path, but in configuring the switch after the FLOGI/FDISC. The switch can route based on the source MAC for FCoE frames by using the routing table, and this avoids latency issues. Once the server FLOGI is converted to FDISC by the management processor and an ACC is received, the management processor will know the assigned FC port id (e.g., 4). The management processor will also know which FC uplink port was used to send the FDISC. This is when the management processor will program the Ethernet switch chip to setup a route for FC ID '4'.

Using the Fabric Provided MAC Address as the source for the frames sent over FCoE, means that a translation table does not need to be maintained in the NPIV device that looks up the server's FC MAC address for each frame. This type of lookup would slow down the transfer of data, and avoiding the lookup increases the device's throughput.

In addition to the described conversion that can take place, administrators can configure the virtual connections for any number of the logical NICs to communicate in a number of ways. For example, the link can operate as pure Ethernet, FCoE-to-Ethernet, FCoE-to FC with NPIV (which has been described in detail), or iSCSI. A specific amount of associated bandwidth can also be allocated for each logical NIC.

Figure 3:
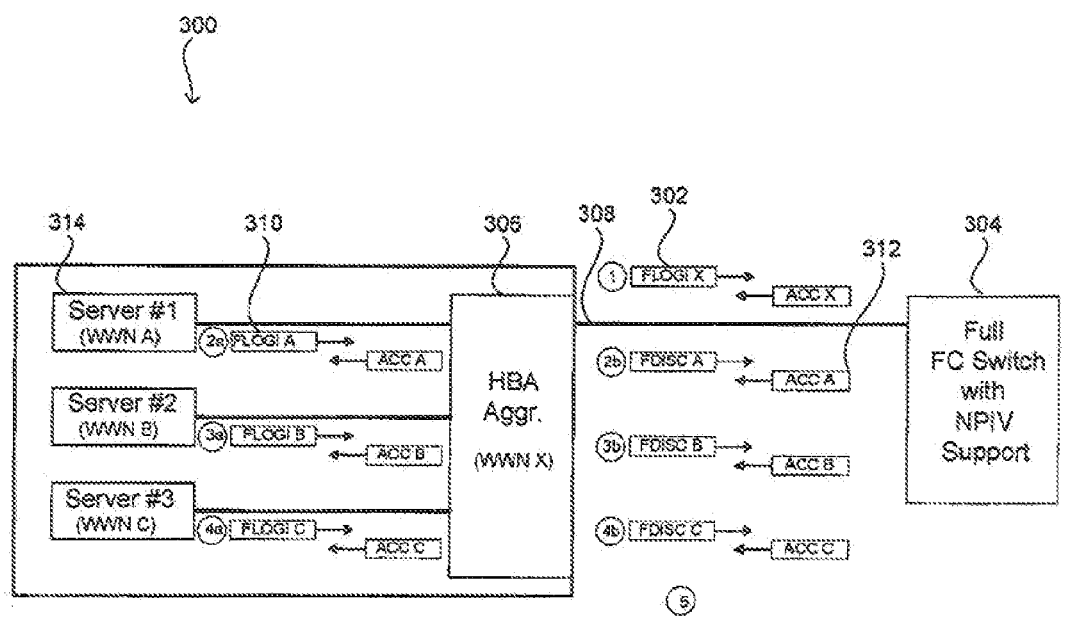
FIG. 3 is a chart illustrating NPIV logins from multiple servers using operations that can take place to interface a Fibre Channel network to these servers where the interconnect module acts as an HBA aggregator and manages server login requests.

FIG. 3 is a flow chart illustrating an embodiment of a method for interfacing a Fibre Channel network to an Ethernet-based network. The method can include the operation of establishing an N_port ID virtualization (NPIV) link 302 between a Fibre Channel device 304 and an NPIV interface in the Ethernet interconnect module 306. An example of a Fibre Channel device is a Fibre Channel switch, but other types of devices can be accessed that are compatible with the Fibre Channel fabric. The establishment of an N_port ID virtualization (NPIV) link can also include configuring uplinks for Fibre Channel NPIV operations using the management processor.

A Fibre Channel fabric login (FLOGI) can be performed for the NPIV interface using a management processor. The Ethernet bridge can also be configured by the management processor to redirect certain FC frames (e.g., FLOGI) to the management processor. The management processor can also handle link-down time and link-up time changes.

A port ID is assigned to the Fibre Channel device for the NPIV interface once the FLOGI has been accepted by the Fibre Channel device. An FLOGI 310 may then be received from a server 314 on the Ethernet based network. The FLOW can contain a server identity ID of the server, and the FLOGI is converted to a FDISC operation.

The management processor in the Ethernet interconnect module can then examine the acknowledgement frames 312 for the FDISC operation from the Fibre Channel device in order to identify the N_Port ID (or domain ID) of server. The N_Port ID is a World Wide Name (WWN) of the server, the Originator Exchange ID (OX_ID) of the server, the Receiver Exchange ID (RX_ID) of the server, or a similar Fibre Channel address for the server. The management processor is able to use the N_Port ID (or domain ID) to match the incoming acknowledgement frame to the FDISC operation so the management processor can direct the acknowledgement to the right server port MAC address.

When the acknowledgement frames reach the Ethernet interconnect module, the server MAC address is retrieved from a table using the N_Port ID for lookup. Then the server 314 is sent an Ethernet packet using the server MAC address. The Ethernet packet contains a Fabric Provided MAC Address as the packet's payload and this Fabric Provided MAC address is used to enable the server to communicate with the Fibre Channel device through the NPIV port. In other words, the server is instructed to use the Fabric Provided MAC address from the NPIV interface as the server's source for transmitted frames.

As discussed before, the Fibre Channel frames addressed to the FCoE fabric are encapsulated Ethernet packets. While the NPIV Link device is performing the encapsulation and decapsulation, the NPIV Link device is also able to block non-FCoE frames from entering the FCoE fabric.

In one embodiment, the Ethernet interconnect module can be configured to automatically detect the type of optical link connection and configure the communication protocol accordingly. Accordingly, the Ethernet interconnect module can automatically configure a communication channel for Ethernet or Fibre Channel communication based on the type of optical transceiver programmed into the pluggable module inserted into the faceplate of the interconnect module.

The system and methods described enable data transfer between a server and a Fibre Channel device using Ethernet interconnect module and an NPIV link device. This avoids the costs that might otherwise be incurred by using a full feature FCF switch In addition, the fabric is simplified because the Ethernet interconnect module does a minimal amount of processing in order to pass the frames over to the FCoE network. In a sense, the server source can use the Fabric Provided MAC Address to communicate natively with the Fibre Channel fabric after Ethernet packets from the server are decapsulated.

The described system and method provides a networking bridging system which can use cables that are vendor independent and results in a reduction in the number of switch ports. In addition, the FCoE-to-NPIV function allows the FCoE and bridging module to connect to any vendor's (Cisco, Qlogic, McData, Brocade) Fibre Channel switch. This helps overcome the compatibility issues that have frequently existed in the past. In addition, this interfacing device enables a complete separation of storage and networking traffic as data leaves the edge of a blade server enclosure that contains servers utilizing SAN storage. Similarly, this system and method reduces the number of cables leaving a blade server enclosure without adding a managed switch.

Compatibility is another result of the system and method for bridging between the two types of networks. For example, the FCoE to Fibre Channel gateway can be compatible with the vendor-independent Ethernet connectivity approach provided by Virtual Connect Ethernet modules. This compatibility also flows from the use of a single interconnect module that can be used for external connection to both Ethernet and Fibre Channel fabrics. The ability to perform these functions using only one interconnect reduces the number of interconnect modules used. Using fewer modules reduces the overall cost of the interconnect solution for the end user.

The functionality used to support the system and method described above can be programmed into firmware or hardware in a FCoE gateway module. Alternatively, this system can be software that is loaded from a mass storage device onto the gateway or bridging module.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for interfacing a Fibre Channel network to an Ethernet based network, comprising:
    establishing a connection between a Fibre Channel device on the Fibre Channel network and an N_Port ID virtualization (NPIV) interface in an Ethernet interconnect module, the connection associated with a port ID assigned by the Fibre Channel device;
    processing, by the Ethernet interconnect module, a fabric login from a server on the Ethernet based network, the fabric login including a server identifier that is sent to the Fibre Channel device;
    examining, by a management processor in the Ethernet interconnect module, acknowledgement frames for the fabric login from the Fibre Channel device, to identify an N_Port ID of the server;
    retrieving a server MAC address stored in the Ethernet interconnect module using the N_Port ID of the server for lookup; and
    sending the server an Ethernet packet using the server MAC address, wherein the Ethernet packet contains a Fabric Provided MAC Address used to enable the server to communicate with the Fibre Channel device on the Fibre Channel network.

2. The method of claim 1, further comprising encapsulating Fibre Channel frames addressed to an FCoE (Fibre Channel over Ethernet) fabric and decapsulating FCoE frames from the FCoE fabric and addressed to the Fibre Channel network using the NPIV interface.

3. A method for interfacing a Fibre Channel network to an Ethernet based network using an Ethernet interconnect module, comprising:
    establishing an N_Port ID Virtualization (NPIV) link between a Fibre Channel device on the Fibre Channel network and an NPIV link interface in the Ethernet interconnect module;
    performing a Fibre Channel fabric login (FLOGI) for the NPIV link interface using a management processor in the Ethernet interconnect module;
    accepting an N_Port ID assignment from the Fibre Channel device for the NPIV link interface once the FLOGI has been accepted by the Fibre Channel device;
    receiving an FLOGI from a server on the Ethernet based network, along with a World Wide Name (WWN) of the server, wherein the FLOGI from the server is converted into a fabric discovery (FDISC) operation from the Fibre Channel device;
    examining acknowledgement frames for the FDISC operation, using the management processor, to identify an N_Port ID of the server;
    retrieving a server MAC address from a table using the N_Port ID of the server for lookup; and
    sending the server an Ethernet packet using the server MAC address, wherein the server MAC address contains a Fabric Provided MAC Address used to enable the server to communicate with the Fibre Channel device through the NPIV link interface.

4. The method of claim 3, further comprising instructing the server to use the Fabric Provided MAC Address as the server's source address for frames transmitted by the server.

5. The method of claim 3, further comprising encapsulating Fibre Channel frames addressed to an Fibre Channel over Ethernet (FCoE) fabric.

6. The method of claim 5, further comprising adding an Ethernet header, a checksum and padding values to the Fibre Channel frames.

7. The method of claim 3, further comprising decapsulating Fibre Channel over Ethernet (FCoE) frames addressed to the Fibre Channel network.

8. The method of claim 7, further comprising decapsulating the Fibre Channel over Ethernet (FCoE) frames by removing an Ethernet header, Start of Frame (SOF), End of Frame (EOF) delimiters, checksum and padding values.

9. The method of claim 3, further comprising blocking non-Fibre Channel over Ethernet (FCoE) frames from entering an FCoE (Fibre Channel over Ethernet) fabric.

10. The method of claim 3, wherein the Ethernet based network includes a Fibre Channel over Ethernet (FCoE) fabric.

11. The method of claim 3, wherein the Fibre Channel device is a Fibre Channel switch.

12. The method of claim 3, wherein the N_Port ID of the server is a World Wide Name (WWN), Originator Exchange ID (OX_ID) of the server, or Receiver Exchange ID (RX_ID).

13. The method of claim 3, further comprising enabling the Ethernet interconnect module to automatically configure a communication channel for Fibre Channel over Ethernet (FCoE) or Fibre Channel communication based on an optical transceiver type detected by the Ethernet interconnect module.

14. A system for interfacing between a Fibre Channel network and an Ethernet network, comprising:
an Ethernet interconnect module configured to receive a data stream from a data server on the Ethernet network, the data server using a Fibre Channel over Ethernet (FCoE) protocol;
an N_Port ID Virtualization (NPIV) link interface located in the Ethernet interconnect module and configured to handle encapsulation of Fibre Channel frames from a Fibre Channel device on the Fibre Channel network, and decapsulation of FCoE frames from the data server; and
a management processor located in the Ethernet interconnect module and configured to:
examine acknowledgement frames for a fabric discovery (FDISC) operation from the Fibre Channel device, to identify a server domain ID;
retrieve a server MAC address from a table using the server domain ID for lookup; and
send the data server an Ethernet packet using the server MAC address, wherein the Ethernet packet contains a Fabric Provided MAC Address used to enable the data server to communicate with the Fibre Channel device through the NPIV link interface.

15. The system of claim 14, wherein the NPIV link interface is configured to encapsulate Fibre Channel frames destined for a FCoE fabric and decapsulate FCoE frames destined for the Fibre Channel network.

16. The system of claim 15, wherein the Fibre Channel frames are encapsulated by adding an Ethernet header, a checksum, Start of Frame (SOF), End of Frame (EOF) delimiters, and padding values.

17. A method for interfacing a Fibre Channel network to an Ethernet based network, comprising:
establishing a link between a Fibre Channel device on the Fibre Channel network and an NPIV interface in an Ethernet interconnect module;
receiving a fabric login from a server on the Ethernet based network; examining acknowledgement frames for the fabric login from the Fibre Channel device, using a management processor in the Ethernet interconnect module, to identify a server domain ID; and
retrieving a server MAC address using the server domain ID for lookup; and
sending the server an Ethernet packet using the server MAC address, wherein the Ethernet packet contains a Fabric Provided MAC Address used as a server source address to communicate with the Fibre Channel network.

* * * * *